Sept. 1, 1964  R. E. STURDIVAN  3,147,405
CIRCUIT BREAKER ENCLOSURE
Filed Feb. 6, 1961  2 Sheets-Sheet 1
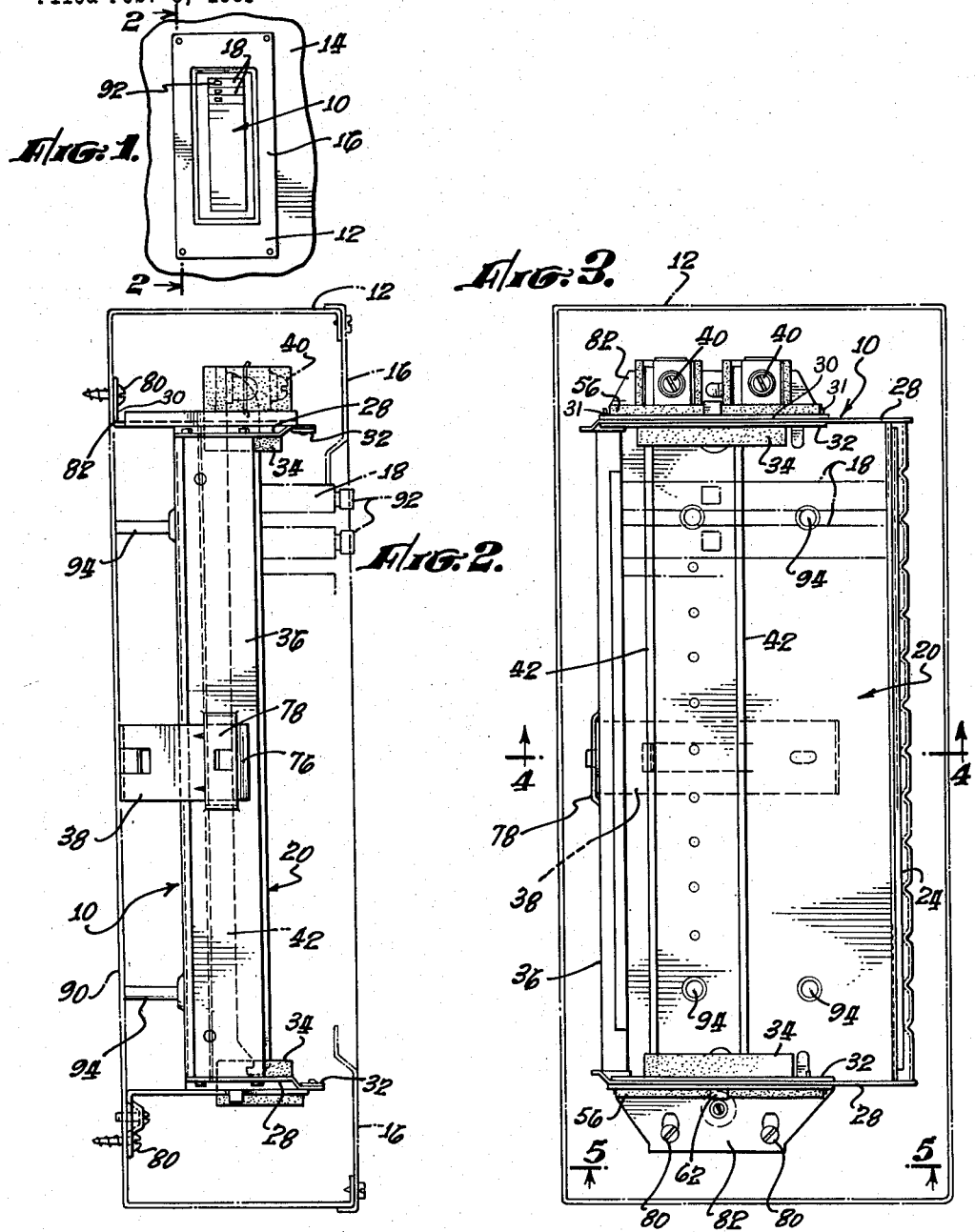
Rex E. Sturdivan,
INVENTOR.
BY HIS ATTORNEYS.
Harris, Kiech, Russell & Kern

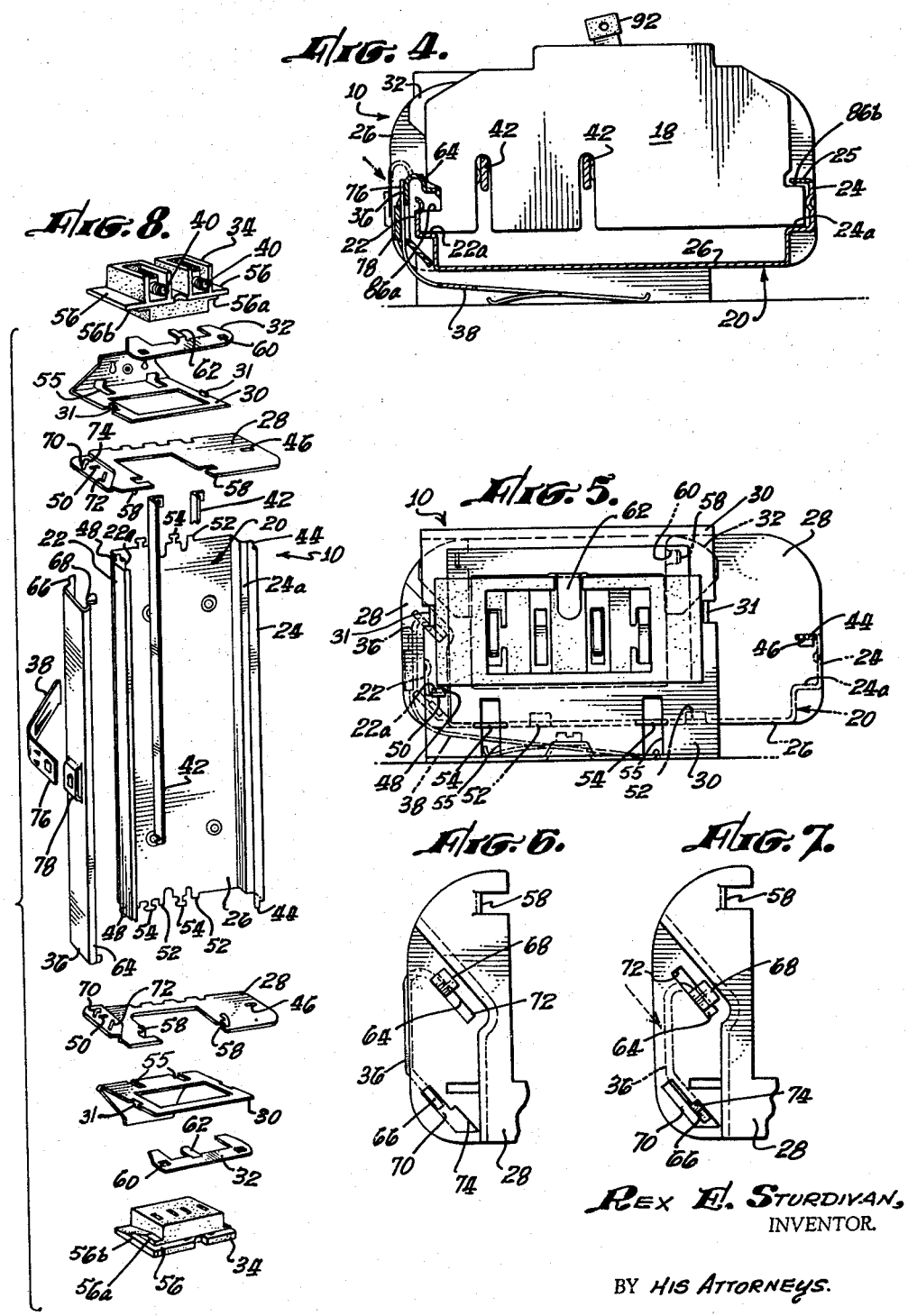

United States Patent Office 3,147,405
Patented Sept. 1, 1964

3,147,405
CIRCUIT BREAKER ENCLOSURE
Rex E. Sturdivan, Fullerton, Calif., assignor to Zinsco Electrical Products, Los Angeles, Calif., a corporation of California
Filed Feb. 6, 1961, Ser. No. 87,429
6 Claims. (Cl. 317—119)

This invention relates to circuit breaker enclosures or mounting pans and, more particularly, provides an improvement in circuit breaker mounting pans of the type having bus bars running longitudinally of the pan with the circuit breakers removably positioned across the bus bars transversely of the pan with opposite ends of the circuit breakers adjacent the longitudinal sides of the pan.

Circuit breaker enclosures or mounting pans of the foregoing description carry across their bus bars circuit breakers of the general type disclosed in U.S. Patent No. 2,878,332, Locher. The individual circuit breakers are installed in the mounting pan after the mounting pan is positioned within a familiar panel box which is usually recessed into a wall, flush with the wall's outer surface. The circuit breakers for a home or other site are elected and positioned within the mounting panel to obtain proper load distribution of the electric current. Home owners and others have been known to interchange circuit breakers and bring about improper load distribution. To avoid this condition, electrical codes in a number of cities have now been modified to require the use of circuit breaker enclosures or mounting pans of designs that reduce the likelihood of tampering by the uneducated.

Circuit breaker mounting pans are positioned within panel boxes of differing depths, with the result the handles of the circuit breakers (where the circuit breaker contains a switch feature) may be located at varying distances from the face of the panel box. This is especially objectionable where no door is employed to enclose the panel box because in such installations it is desirable that the handles of the circuit breakers be nearly flush with the wall and outer face of the panel box.

In the improved circuit breaker mounting pan of the invention, provision is had for locking the circuit breakers in place following their installation and, when thusly positioned, the several circuit breakers cannot in the preferred embodiment of the invention be removed from the mounting pan until the entire mounting pan is removed from the panel box or receptacle housing in which it is placed. This arrangement discourages the uneducated from meddling. In the improved circuit breaker mounting pan of the invention, there is provided a turned-in lip carried by one of the longitudinal sides of the pan. The lip is spaced from the bottom of the pan. A movable turned-in lip is carried by the other longitudinal side of the pan, the latter lip being movable toward and away from the pan bottom. The two turned-in lips respectively engage locking ledges provided in the opposite ends of the several circuit breakers, thus serving to hold the circuit breakers within the pan. Means are provided for locking the movable turned-in lip to the mounting pan.

The movable lip is generally an integral part of a movable side member which forms one of the longitudinal sides of the pan with the turned-in lip extending over and inwardly of the upper edge of that longitudinal side of the mounting pan. In the preferred embodiment of the mounting pan of the invention, two legs are respectively located at the opposite ends of the pan, serving to elevate the pan with the outer ends of the two legs being provided with outwardly turned flanges for attachment to the back wall of the panel box. A flat spring member is disposed generally beneath the elevated pan bottom of the preferred embodiment, engaging the back wall of the panel box upon installation of the mounting pan therein. The flat spring member has a turned end which is fastened to the movable side member. The spring member, with placement of the movable side member in its lowered position, serves to lock the side member in this lowered position.

The movable side member at each of its ends preferably has two tabs which are slidably held in slots of the adjoining end plates. The slots in each end plate retaining the bottommost tabs have locking notches out of line with the slots proper for holding the tabs contained therein under the force of the flat spring member.

The preferred form of the circuit breaker mounting pan of the invention has a design that permits depth adjustment of the mounting pan within the panel box to obtain a flush or substantially flush placement of the handles of the circuit breakers. This provision facilitates the use of the circuit breaker mounting pan of the invention with panel boxes of varying dimensions. The mounting pan of this preferred form has its two legs slidably fastened to opposite ends of the pan. The spring member urges the mounting pan outwardly away from the back interior wall of the panel box. Means is provided countering the force of the spring member which permits adjustment of the distance between the mounting pan bottom and the back interior wall of the panel box, thereby providing adjustment in the placement of the handles of the circuit breakers with respect to the front face of the panel box. The means for adjustment of distance may conveniently take the form of long screws extending through the bottom of the mounting pan into the back interior wall of the panel box.

The foregoing objects, advantages, features and results of the present invention, together with various other objects, advantages, features and results thereof which will be evident to those skilled in the art in light of this disclosure may be achieved with the exemplary embodiment of the invention described in detail hereinafter and illustrated in the accompanying drawings.

In the drawings:

FIG. 1 is a front elevational view on a reduced scale of the circuit breaker mounting pan of the invention positioned within an open panel box;

FIG. 2 is a longitudinal sectional view, partly in side elevation, taken along line 2—2 of the panel box of FIG. 1 and showing in particular the preferred embodiment of the circuit breaker mounting pan of the invention;

FIG. 3 is a front elevational view on hte same scale as FIG. 2 providing further detail of the circuit breaker mounting pan of the invention;

FIG. 4 is a cross-sectional view taken along line 4—4 of FIG. 3;

FIG. 5 is a cross-sectional view of the panel box of FIG. 3 taken along line 5—5 of that view and providing in particular an end view of the circuit breaker mountng pan of the invention;

FIG. 6 is a fragmentary end view of the mounting pan with insulator block removed and illustrating the movable side member in its open elevated position;

FIG. 7 is an end view similar to that of FIG. 6 but illustrating the movable side member in its lowered locking position; and FIG. 8 is an exploded view of the several parts making up the circuit breaker mounting pan of the invention.

With reference to FIGS. 1–3 inclusive there is illustrated a preferred embodiment of the mounting pan 10 of the invention contained within a panel box 12 which is recessed in a wall 14 with the front face of the panel box 12 being substantially flush with the outer wall surface. As best seen in FIG. 2, the mounting pan is affixed to the back interior wall of the panel box 12 and is partially shielded from frontal view by a perimeter shroud 16. The shroud 16 does not enclose circuit breakers 18, two of which are indicated in phantom lines in FIG. 2. The circuit breakers 18 may completely fill the space between the upper and lower portions of the shroud 16.

The mounting pan, as best seen in the exploded view of FIG. 8, comprises a body member 20 made up of two longitudinal sides 22 and 24 integrally formed with a bottom 26, two end plates 28, two sliding leg members 30, two retainer spring members 32, two insulator blocks 34, a movable side member 36, and a strap spring locking member 38. It will be noted that no bolts or screws are used in fastening the several component members together. The mounting pan 10 is held together by tabs engaging holes of companion pieces and by the bending over of tabs to provide locking means. One of the insulator blocks 34 differs from the other in carrying two terminal connections 40 for two bus bars 42.

The longitudinal sides 22 and 24 of the mounting pan 10 do not, as best seen in FIGS. 4 and 5, extend directly up from hte pan bottom 26 but are outwardly stepped midway their height to provide respectively ledges 22a and 24a for support of the circuit breakers 18. The longitudinal side member 24 at each of its ends adjacent its upper edge carries an outwardly extending tab 44 (see FIG. 8) which engages slot 46 of the adjoining end plate 28. The other longitudinal side member 22 has a tab 48 extending outwardly from each end of its ledge 22a, which tabs fit into slots 50 of the two end plates 28. The bending over of the several tabs 44 and 48 fixes the end plates to the body member 20. The side member 24 is provided with a turned-in lip 25. The bottom 26 of the body member 20 at each end is provided with two tabs 52 that are bent to engage the outside of the end plates 28. In addition the bottom 26 carries two outwardly extending T-shaped projections 54 (see FIG. 8) at each end which assist in slidably holding the two sliding legs 30 to the mounting pan 10 through cooperation with slots 55 of the two legs. Each end plate 28 has a generally rectangular opening sized to receive one of the insulator blocks 34. Each of the insulator blocks 34 is provided with a flange 56 and a raised portion 56a which engages the outside face of an end plate 28. The end plates 28 are provided with two inwardly-extending hook-tabs 58 (see FIG. 8) which cooperate with slots 60 in the retainer spring members 32 to hold the assembly together. It will be noted that each of the retainer spring members 32 has an integrally formed tongue 62 which in the assembled mounting pan, as best seen in FIG. 5, engages the outside face of an insulator block 34 while the retainer spring member 32 proper is held fast against the inner face of an end plate 28 with its slots 60 retaining the tab hooks 58 of the end plate 28.

Each of the sliding legs 30 in the assembled mounting pan 10 is held against the outside face of an end plate 28 by an outer rim portion 56b of a flange 56 of an insulator block 34. It will be recalled that the raised portion 56a of the flange engages the outside face of the end plate 28. thus the outer rim portion 56b of the flange is spaced from the end plate, in which space the outer side of the sliding leg 30 is held. Each sliding leg 30 has a portion 31 of its outer two edges turned outwardly to form a slide (see FIGS. 3 and 5) for engaging its respective insulator block 34.

The movable side member 36 has the general configuration of the upper portion of the longitudinal side member 22 and is provided with an inwardly extending lip 64 running the length of the movable side member. The lip 64, as best seen in FIGS. 6 and 7 extends both inwardly and downwardly towards the mounting pan bottom 26. The movable side member 36 at its opposite ends carries two tabs 66 and 68 which are movably carried in slots 70 and 72 of the end panels 28. It will be noted that the slots 70 and 72 are considerably longer than the tabs, thus providing for movement of the movable side member towards and away from the bottom 26 of the mounting pan 10. Each of the lower slots 70 has a locking notch 74 as best seen in FIG. 6 which is out of line with the slot 70 proper, which locking notch serves to hold the tab contained therein (see FIG. 7) under the force of the strap spring locking member 38. The movable side member 36 has an elevated position as illustrated in FIG. 6 wherein the lower tab 66 is away from the locking notch 74 and within the slot 70 proper. The movable side member 36 in its lowered or locked position, as illustrated in FIG. 7, has its respective tabs at the lower ends of the slots 70 and 72, with the lower tab more particularly within the locking notch 74.

The strap spring locking member 38 takes the form of a flat spring which is disposed generally beneath the elevated pan bottom 26 and in engagement with a supporting surface upon the installation of the mounting pan 10. The spring locking member 38 has a turned end 76 held in a slotted and raised portion 78 of the movable side member 36. It will be seen that with movement of the movable side member to its lowered or locked position the spring locking member 38 acts to lock the movable side member in such position by holding of the lower tabs 66 within the locking notches 74 of the lower slots 70 of the end plates 28.

An installed mounting pan 10 as illustrated in FIGS. 1–3 is situated within the panel box 12. The mounting pan 10 is held to the back interior wall of the panel box 12 by screws 80 (FIG. 2) which pass through outwardly extending flanges 82 of the two sliding legs 30. Following installation of the mounting pan 10 the circuit breakers 18 are placed to straddle the two parallel bus bars 42 (see FIGS. 3 and 4) with their undersides resting on ledges 22a and 24a. It will be seen that the circuit breakers 18 are provided in their opposite ends with inwardly-extending locking ledges 86a and 86b. In positioning of the circuit breakers 18 within the mounting pan 10, the locking ledge 86b is placed beneath the turned-in lip 25 of the longitudinal side 24, and swung downwardly into the position of FIG. 4, straddling the two bus bars 42. Opposite ends of the circuit breakers 18 rest on the ledges 22a and 24a of the longitudinal sides 22 and 24. At this time the movable side member 36 is in its elevated position of FIG. 6. Following positioning of the several circuit breakers 18 within the mounting pan 10, the movable side member 36 is lowered into the position of FIG. 7 locking the several circuit breakers 18 into the mounting pan 10. Once the movable side member 36 has assumed the position of FIG. 7, it is not possible to elevate it without removing the whole mounting pan 10 from the panel box 12. This arrangement, it will be appreciated, discourages the amateur from tampering with the circuit breakers. The turned-in lips of the longitudinal sides 22 and 24 of the mounting pan effectively cooperate with the locking ledges 86a and 86b of the circuit breakers 18 to retain the circuit breakers within the pan. The preferred embodiment of the mounting pan 10 of the invention as illustrated is provided with means countering the force of the spring locking member 38, permitting adjustment of the distance between the mounting pan bottom 26 and rear wall 90 of the panel box 12. The foregoing provision facilitates placement of the mounting pan 10 within the panel box 12 to a depth that places the circuit breaker switch handles 92 (see FIG. 2) nearly flush with the surface of the wall 14. The means provided for countering the force of the spring locking member 38 in the embodiment illustrated takes the form of several screws 94 whose heads engage the inside bottom of the mounting pan 10 and whose threaded ends seat in the rear wall 90 of the panel box 12.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:
1. In a mounting pan for circuit breakers, the improvement comprising:
   a movable side member mounted over a side of the pan and movable to an elevated and to a lowered position with respect to the pan bottom with a turned-in lip of said movable side member extending over and inwardly of the upper edge of said pan side, said movable side member at its two ends having tabs that are slidably held in slots provided in end members of the mounting pan, said turned-in lip engaging locking ledges of the circuit breakers, thereby assisting in holding said circuit breakers within the pan;
   two legs respectively located at the opposite ends of the mounting pan serving to elevate the pan, said two legs being attachable to a supporting surface; and
   a flat spring member disposed generally beneath the elevated pan bottom and engaging the supporting surface upon installation of the mounting pan, said flat spring member having a turned-end fastened to the movable side member, said spring member with movement of the movable side member to its lowered position acting to lock the movable side member in such position.

2. A circuit breaker mounting pan in accordance with claim 1 wherein the movable side member at each of its ends has two tabs and wherein the slot retaining the bottommost tab at each of the respective ends has a locking notch out of line with the slot proper for holding the tab contained therein under the force of the flat spring member.

3. In a circuit breaker mounting pan, the improvement comprising:
   a movable side member mounted over a longitudinal side of the pan and movable to an elevated and to a lowered position with respect to the pan bottom with a turned-in lip of said movable side member extending over and inwardly of the upper edge of said longitudinal side, said turned-in lip engaging locking ledges of the circuit breakers, thereby assisting in holding said circuit breakers within the pan;
   leg members serving to elevate the pan, said leg members being attachable to a supporting surface; and
   a flat spring member disposed generally beneath the elevated pan bottom and engaging the supporting surface upon installation of the mounting pan, said flat spring member having a turned end fastened to the movable side member, said spring member with movement of the movable side member to its lowered position acting to lock the movable side member in such position.

4. In a circuit breaker mounting pan having bus bars running longitudinally of the pan and adapted to hold circuit breakers removably positioned across the bus bars transversely of the pan with opposite ends of the circuit breakers adjacent opposed longitudinal sides of said pan, the improvement comprising:
   a turned-in lip along the upper edge of one longitudinal side of the mounting pan;
   a movable side member mounted over the other longitudinal side of the pan and movable to an elevated and to a lowered position with respect to the pan bottom with a turned-in lip of said movable side member exending over and inwardly of the upper edge of said other longitudinal side member, said movable side member at its two ends having tabs that are slidably held in slots provided in end members of the mounting pan, said two turned-in lips respectively engaging locking ledges provided in the opposite ends of the circuit breakers, thereby holding said circuit breakers within the pan;
   two legs respectively located at the opposite ends of the mounting pan serving to elevate the pan, said two legs being attachable to a supporting surface; and
   a flat spring member disposed generally beneath the elevated pan bottom and engaging the supporting surface upon installation of the mounting pan, said flat spring member having a turned end fastened to the movable side member, said spring member with movement of the movable side member to its lowered position acting to lock the movable side member in such position.

5. A circuit breaker mounting pan in accordance with claim 4 wherein the movable side member at each of its ends has two tabs and wherein the slot retaining the bottommost tab at each of the respective ends has a locking notch out of line with the slot proper for holding the tab contained therein under the force of the flat spring member.

6. In circuit breaker mounting pan construction the improvement comprising:
   two insulator blocks provided at opposing ends with outwardly extending flanges;
   two end plates enclosing opposite ends of the mounting pan, each of said end plates having a hole opening exteriorly of the plate, said holes being sized to receive the longitudinal sections of the insulator blocks held therein with the outwardly extending flanges of said insulator blocks engaging the outer faces of the end plates immediately adjacent the holes, each of said end plates having two spaced, inwardly-extending tabs adjacent its respective hole; and
   two retainer spring members, each formed of flat sheet metal and provided with two tab-receiving holes spaced apart the distance separating the two tabs of the respective end plates, each of said retainer spring members having a hook member extending substantially perpendicularly of the plane of the retainer spring member and adapted with placement of the spring retainer member over the tabs of the end plate to engage the outer face of the insulator block holding the block in locked position against the end plate.

References Cited in the file of this patent
UNITED STATES PATENTS

| | | |
|---|---|---|
| 1,601,312 | Krantz | Sept. 28, 1926 |
| 2,530,548 | Stanley | Nov. 21, 1950 |
| 2,758,257 | Wills | Aug. 7, 1956 |
| 2,946,928 | Slade | July 26, 1960 |